(12) United States Patent
Carley et al.

(10) Patent No.: US 6,463,923 B2
(45) Date of Patent: Oct. 15, 2002

(54) GRILL

(75) Inventors: Duane Alvin Carley; Robert Leroy Polkinghorn, both of Dodgeville; Timothy Allen Polkinghorn, Mineral Point, all of WI (US)

(73) Assignee: Primo Ceramics, LLC, Doraville, GA (US)

( * ) Notice: Subject to any disclaimer, the term of this patent is extended or adjusted under 35 U.S.C. 154(b) by 0 days.

(21) Appl. No.: 09/821,378

(22) Filed: Mar. 29, 2001

(65) Prior Publication Data

US 2002/0139364 A1 Oct. 3, 2002

(51) Int. Cl.$^7$ .............................. F24B 3/00; E05D 11/10
(52) U.S. Cl. ..................... 126/25 R; 126/41 R; 16/321
(58) Field of Search ............................. 126/25 R, 41 R, 126/25 AA, 9 R, 9 A, 25 C, 38, 37 B; 220/810, 348, 823; 16/319, 321, 333, 322

(56) References Cited

U.S. PATENT DOCUMENTS

| | | | | |
|---|---|---|---|---|
| 2,244,145 A | * | 6/1941 | Erickson | .................. 126/41 R |
| 3,029,754 A | * | 4/1962 | Doyle | ...................... 126/41 R |
| 4,256,080 A | * | 3/1981 | Seach | ....................... 126/25 R |
| 4,836,179 A | * | 6/1989 | Schlosser et al. | ......... 126/41 R |

* cited by examiner

*Primary Examiner*—James C. Yeung
(74) *Attorney, Agent, or Firm*—Baker, Donelson, Bearman, Caldwell

(57) ABSTRACT

A grill (10) is disclosed having a tub (11) and a hood (12) pivotally mounted to the tub (11) by a rear hinge (13). The hinge (13) has a lower portion (16) and an upper portion (17) pivotally mounted to the lower portion (16) through a pair of pivot pins (18). The lower portion (16) includes a lower ring (21) mounted about the periphery of the tub (11) and a latch bar (22) mounted to the lower ring (16) through latch member (23). The upper portion (17) includes an upper ring (27) mounted about the periphery of the hood (12) and a catch (28) mounted to the upper ring (27) through catch member (29). The catch (28) has a catch plate (31) having a bearing portion (32) extending to a trough (33), configured to receive the latch bar (22). The catch plate (31) is coupled to the upper ring (27) through a mounting bolt (36), extending through the catch plate (31). A spring (41) is mounted about the mounting bolt (36) so as to place a biasing force upon the catch plate (31) in an outwardly direction.

16 Claims, 2 Drawing Sheets

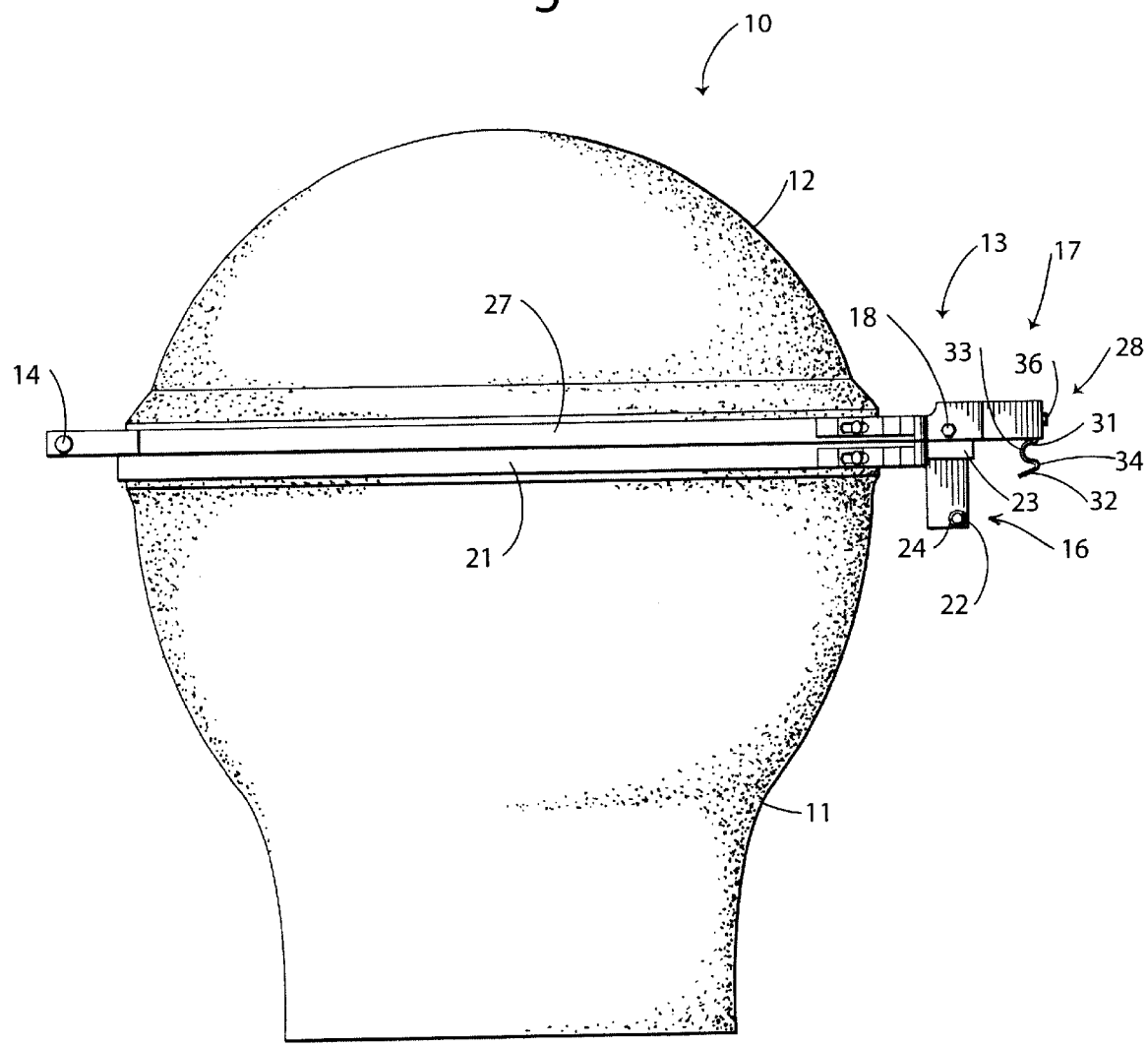

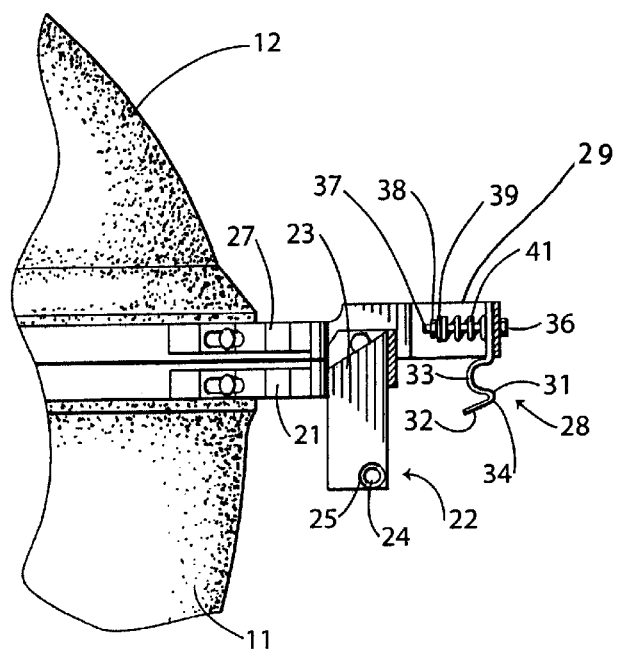
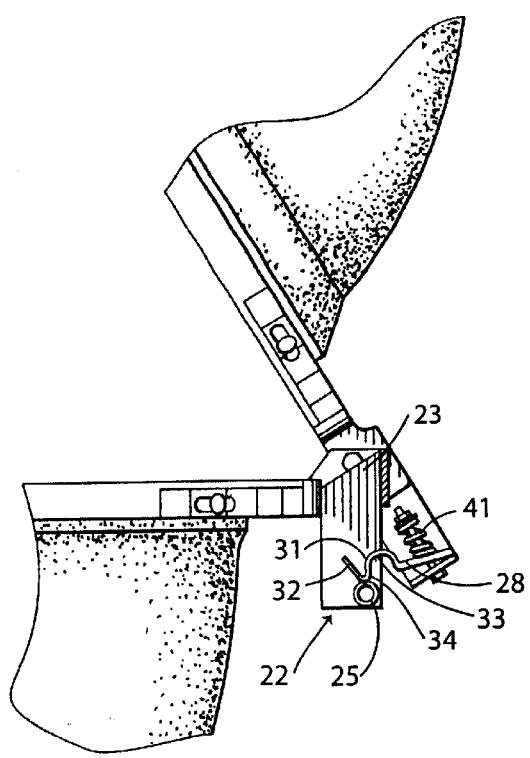

GRILL

TECHNICAL FIELD

This invention relates to grills and especially to grills have heavy top hoods.

BACKGROUND OF THE INVENTION

Bar-b-que grills and smokers have existed for centuries. Today's grills typically include a lower tub and a hood adapted to mate with the top of the lower tub. The grill also includes a food grate mounted adjacent the top of the lower tub and either a gas burner or a specified area for charcoal or the like adjacent the bottom of the lower tub.

In the past, the hood has been coupled to the lower tub through many different types of hinges. One type of hinge, as shown in U.S. Pat. No. 4,108,141, has one end pivotally mounted to a forward portion of the hood and an opposite end pivotally mounted to a rearward portion of the tub. While this type of hinge works adequately with light hoods, such is not practical with hoods have a substantial weight as the wieght of the hood causes the hinge to close.

Grills have also been adapted to include hinges coupling the hood to the tub in a manner to allow the hood to be pivoted to a position wherein the center of gravity of the hood is positioned past the position of the hinge, as shown in U.S. Pat. No. 3,789,822. Once the hood is moved to its fully open position the hoods center of gravity prevents it from pivoting back to its closed position. This positioning of the hood however places a great deal of pressure upon the hinge. As such, this type of arrangement practically may not be utilized with a grill having a heavy hood.

Recently, ceramic grills and smokers made in the tradition of Asian Kamado grills have gained popularity. These grills have both a lower tub and a hood made of thick ceramic material. As such, the hood of these grills are extremely heavy. Some such grills have simply had the hood disconnected from the tub, thus requiring the placement of the hood on the ground when one opens the grill. This approach to opening the grill during use is both inconvenient and unsanitary. Ceramic grills have also included two locking hinges on opposite sides of the grill, as shown in U.S. Pat. No. Des. 420,243, which is also designed by the present inventor. As an operator must manually actuate both hinges to unlock them while simultaneously holding the grill hood these hinges have proved to be inadequate.

Accordingly, it is seen that a need remains for a grill having a hinge that may be utilized with a heavy grill hood. It is the provision of such that the present invention is primarily directed.

SUMMARY OF THE INVENTION

In a preferred form of the invention, a grill comprises a tub, a hood configured to mate with the tub, and a hinge pivotally coupling the tub with the hood for reciprocal movement between a hood closed position and a hood open position. The hinge has a first portion having a latch and a second portion having a spring biased catch configured to releasable hold the latch. With this construction, pivotal movement of the hood from its hood closed position to its hood open position causes the latch to be received by the spring biased catch so as to maintain the hood in its open position.

BRIEF DESCRIPTION OF THE DRAWINGS

FIG. 1 is a side view of a grill of the present invention.

FIG. 2 is a partial cross-sectional side view of a portion of the grill of FIG. 1, shown in a closed configuration.

FIG. 3 is a partial cross-sectional side view of a portion of the grill of FIG. 2, shown in a partially opened configuration.

FIG. 4 is a partial cross-sectional side view of a portion of the grill of FIG. 3, shown in a fully opened configuration.

DETAILED DESCRIPTION OF THE DRAWINGS

With reference next to the drawing there is shown a grill 10 in a preferred form of the invention. The grill 10 has a lower housing portion or tub 11 and a dome-shaped top housing portion or hood 12 pivotally mounted to the tub 11 by a rear hinge 13. The grill 10 also has a handle 14 coupled to the front of the hood 12. The grill tub 11 and hood 12 are made of a ceramic material.

The hinge 13 has a lower portion 16 coupled to the tub 11 and an upper portion 17 coupled to the hood 12 and pivotally mounted to the lower portion 16 through a pair of pivot pins 18. The lower portion 16 includes a lower ring 21 mounted about the periphery of the tub 11 and a latch bar 22 mounted to the lower ring through latch member 23. The latch bar 22 has the mounting pin 24 and a sleeve 25 rotatably mounted upon the mounting pin 24. The upper portion 17 includes an upper ring 27 mounted about the periphery of the hood 12 and a catch 28 mounted to the upper ring 27 through catch member 29.

The catch 28 has a catch plate 31 having a bearing portion 32 extending to a trough 33, configured to receive the latch bar 22, the junction of the bearing portion 32 to the trough 33 forms a ridge 34. The catch plate 31 is coupled to the catch member 29 through a mounting bolt 36 extending through the catch plate 31 opposite the bearing portion 32. The mounting bolt 36 has a threaded end 37 upon which is threaded a nut 38 and end washer 39. The catch 28 also includes a coil spring 41 mounted about the mounting bolt 36 and against the end washer 39 so as to place a biasing force upon the catch plate 31 in an outwardly direction.

In use, the grill is maintained in a closed configuration, as shown in FIGS. 1 and 2, with the hood 12 nested upon the top of the tub 11. To move the hood 12 to a held open position an operator grasps the handle 14 and pivots the hood 13 upwardly through the pivotal movement of the hinge 13.

As shown in FIG. 3, as the bearing portion 32 of the catch plate 31 contacts the latch bar 22 the catch plate 31 pivots in a direction opposite to the biasing force of the spring 41, thereby compressing the spring 41. As the latch bar 22 passes over and past the catch plate ridge 34 it is forced into the trough 33 of the catch plate 31 as the catch plate 31 is biased outwardly by spring 41, as shown in FIG. 4. It should be noted that the rotational movement of the latch bar sleeve 25 about the latch bar mounting pin 24 eases the movement of the latch bar 22 upon the catch plate 31.

Once the hood 12 is moved to its fully opened position with the Latch bar 22 positioned within the trough 33 of the catch plate 31 the hood 12 is maintained in this open position by the hinge 13.

It should be understood that the majority of the weight of the heavy hood 12 is directed onto the pivot pins 18 and therefrom to the lower ring 21, while the combination of the catch and latch maintain the hinge 13 in an open configuration with little pressure thereon. However, as the lower ring 21 encompasses the tub 11 the pressure upon the lower ring is dispersed throughout a major portion of the tub 11 instead of upon merely a rear portion of the tub as with the grills of the prior art. This displacement of the pressure restricts damage to tie hinge and to the housing to which the hinge is mounted.

To return the hood 12 to its fully closed position an operator simply grasps the handle 14 and applies a downward pressure upon the handle. This downward pressure causes the hinge upper portion 17 to pivot downwardly about pivot pins 18. Through this movement, the latch bar 22 is forced from the catch plate trough 33 and over the ridge 34 of the catch plate against the biasing force of the spring 41 and to its position shown initially in FIG. 2.

It should be understood that through threaded movement of the nut 38 upon mounting bolt 36, the biasing force of the spring 41 may be changed to increase or decrease the tension upon the catch plate 31. An increase in the pressure would require a larger moment upon the hinge to move the hood from one position to another, while a decrease in the pressure would have the opposite effect. Also, as an alternative to the shown embodiment the direction of the bolt may be reversed so that the threaded end of the bolt is threadably received by catch member 29, whereby threaded movement of the bolt changes the compression upon spring 41.

It should also be understood that other types of conventionally known spring means may be utilized as an alternative to that shown in the preferred embodiment, including but not limited to the catch plate 31 acting as a tension spring through bending movement of the catch plate. It should be understood that the relative positions of the catch and latch may be interchanged.

The hinge 10 allows an operator to open the hood and maintain the hood open with the use of only one hand, unlike the double hinge designs of the prior art which required the manual unlatching of two hinges while simultaneously lifting the hood. This ability to open the hood with one hand enables the operater to carry items with the other hand, such as items to be cooked, rather than having to temporarily set those items aside while the operator open the hood.

It Thus is seen that a grill is capable of holding a heavy grill hood in an open position. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. A grill comprising:
   a tub;
   a hood configured to mate with said tub;
   a hinge pivotally coupling said tub with said hood for reciprocal movement between a hood closed position and a hood open position, said hinge having a first portion having a latch and a second portion having a spring biased catch configured to releasable hold said latch,
   said catch includes a catch plate, a threaded mounting bolt mounted to said catch plate, and spring means for providing a biasing force upon said catch plate,
   whereby pivotal movement of the hood from its hood closed position to its hood open position causes the latch to be received by the spring biased catch so as to maintain the hood in its open position.

2. The grill of claim 1 wherein said spring means comprises a coil spring mounted about said mounting bolt.

3. The grill of claim 2 wherein threaded movement of said mounting bolt changes the compression biasing force of said coil spring.

4. The grill of claim 1 wherein said catch plate has a bearing portion extending to a trough configured to receive said latch.

5. A grill comprising:
   a tub;
   a hood configured to mate with said tub;
   a hinge pivotally coupling said tub with said hood for reciprocal movement between a hood closed position and a hood open position, said hinge having a first portion having a latch and a second portion having a spring biased catch configured to releasable hold said latch,
   said hinge includes a first ring mounted about the periphery of said hood and a second ring mounted about the periphery of said tub,
   whereby pivotal movement of the hood from its hood closed position to its hood open position causes the latch to be received by the spring biased catch so as to maintain the hood in its open position.

6. The grill of claim 5 wherein said catch includes a catch plate coupled to said first ring, a threaded mounting bolt mounted to said catch plate, and spring means for providing a biasing force upon said catch plate.

7. The grill of claim 6 wherein said spring means comprises a coil spring mounted about said mounting bolt.

8. The grill of claim 7 wherein threaded movement of said mounting bolt changes the compression biasing force of said coil spring.

9. A grill comprising:
   a first housing portion;
   a second housing portion configured to mate with said first housing portion;
   a hinge pivotally coupling said first housing portion with said second housing portion for reciprocal movement between a grill closed configuration and a grill open configuration, said hinge having a first portion having a latch and a second portion having a spring biased catch configured to releasable hold said latch,
   said catch includes a catch plate, a threaded mounting bolt mounted to said catch plate, and spring means for providing a biasing force upon said catch plate,
   whereby pivotal movement of the second housing portion from its grill closed configuration to its grill open configuration causes the latch to be received by the spring biased catch so as to maintain the second housing portion in a grill open configuration.

10. The grill of claim 9 wherein said spring means comprises a coil spring mounted about said mounting bolt.

11. The grill of claim 10 wherein threaded movement of said mounting bolt changes the compression biasing force of said coil spring.

12. The grill of claim 9 wherein said catch plate has a bearing portion extending to a trough configured to receive said latch.

13. A grill comprising:
   a first housing portion;
   a second housing portion configured to mate with said first housing portion;
   a hinge pivotally coupling said first housing portion with said second housing portion for reciprocal movement between a grill closed configuration and a grill open configuration, said hinge having a first portion having a latch and a second portion having a spring biased catch configured to releasable hold said latch, said hinge includes a first ring mounted about the periphery of one said housing portion and a second ring mounted about the periphery of another said housing portion, whereby pivotal movement of the second housing portion from its grill closed configuration to its grill open configuration causes the latch to be received by the spring biased catch so as to maintain the second housing portion in a grill open configuration.

14. The grill of claim 13 wherein said catch includes a catch plate coupled to said first ring, a threaded mounting bolt mounted to said catch plate, and spring means for providing a biasing force upon said catch plate.

15. The grill of claim 14 wherein said spring means comprises a coil spring mounted about said mounting bolt.

16. The grill of claim 15 wherein threaded movement of said mounting bolt changes the compression biasing force of said coil spring.

* * * * *